United States Patent [19]

Sheppard et al.

[11] 4,130,912
[45] Dec. 26, 1978

[54] TAPE HEAD CLEANING DEVICE

[75] Inventors: Stewart A. Sheppard, Hailsham; Philip B. Arbib, Chalfont St. Peter; Maurice R. Pert, Great Billington near Leighton Buzzard, all of England

[73] Assignee: Bib Hi-Fi Accessories Limited, Hertfordshire, England

[21] Appl. No.: 738,096

[22] Filed: Nov. 2, 1976

[30] Foreign Application Priority Data

Nov. 27, 1975 [GB] United Kingdom ............... 48897/75

[51] Int. Cl.² .......................... B25G 1/04; G11B 5/41
[52] U.S. Cl. ................... 15/210 R; 15/144 B; 15/145; 403/4
[58] Field of Search ........... 15/104.165, 143 B, 144 B, 15/145, 176, 210 R, 431; 7/15; 81/121 R, 177 R, 177 A, 177 Q, 177 ST; 403/4

[56] References Cited

U.S. PATENT DOCUMENTS

| 326,502 | 9/1885 | Hoffman | 15/431 |
|---|---|---|---|
| 601,134 | 3/1898 | Funk | 81/121 R X |
| 1,469,662 | 10/1923 | Leopold | 81/177 ST X |
| 1,665,988 | 4/1928 | Smith | 15/104.165 |
| 1,874,467 | 8/1932 | Doll | 15/167 R |
| 1,930,238 | 10/1933 | Heller | 81/121 R |
| 2,051,687 | 8/1936 | Dressler | 15/176 |
| 2,624,061 | 1/1953 | Leas | 15/144 B |
| 3,130,433 | 4/1964 | John | 15/210 R |
| 3,536,160 | 10/1970 | Brewer | 184/102 X |
| 3,802,302 | 4/1974 | Bengston | 81/177 A |
| 4,065,801 | 12/1977 | Leaming | 15/246 X |

FOREIGN PATENT DOCUMENTS

| 472556 | 3/1929 | Fed. Rep. of Germany | 128/269 |
|---|---|---|---|
| 674641 | 4/1939 | Fed. Rep. of Germany | 15/435 |
| 216355 | 5/1924 | United Kingdom | 15/176 |
| 258056 | 9/1926 | United Kingdom | 15/145 |

Primary Examiner—Daniel Blum
Attorney, Agent, or Firm—Finnegan, Henderson, Farabow & Garrett

[57] ABSTRACT

A device for cleaning the magnetic heads of magnetic recording and/or playback machines, comprising an elongate holder and a holding member for holding and retaining a tape head cleaner, the holder and the holding device being interconnectible by a spigot and socket connection which is such as to allow a plurality of orientations of the spigot relative to the socket.

13 Claims, 8 Drawing Figures

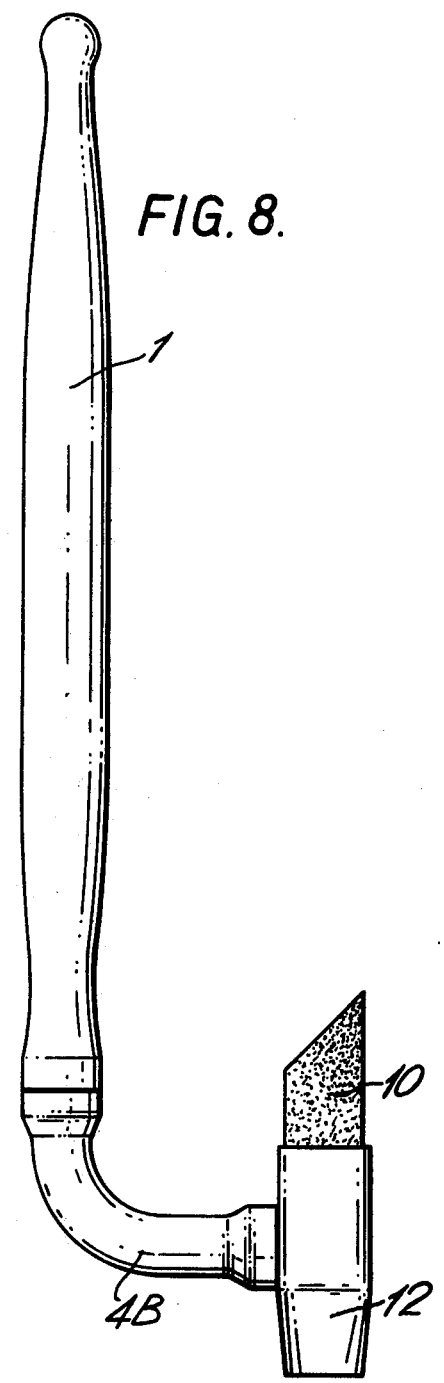

TAPE HEAD CLEANING DEVICE

BACKGROUND OF THE INVENTION

This invention relates to devices for cleaning the magnetic heads of magnetic tape recorders and playback machines.

A known tool for cleaning such magnetic heads comprises a rigid support member to which is permanently attached, for example by adhesive, a felt pad. In use, the pad may be impregnated with a cleaning fluid and is manipulated, using the support member, to clean or polish the magnetic head.

Such a tool is suitable only for machines where the magnetic heads are readily accessible. Although different recording and playback machines have their magnetic heads in different dispositions from each other, the known tool cannot be altered into a configuration which is suitable for any one machine.

One object of the present invention is to provide a device suitable for cleaning the magnetic heads of magnetic tape recorders and playback machines, which device can be adapted for use with different types of machine.

Another object of the present invention is to provide a kit of parts, including at least two interchangeable parts, from which devices of different configurations can be assembled for cleaning magnetic heads.

BRIEF SUMMARY OF THE INVENTION

According to the present invention, there is provided a device suitable for use in cleaning magnetic heads of magnetic tape recording and/or playback machines, the device comprising an elongate holder and a holding member which is constructed to receive and hold a tape head cleaner, one end of the holder on the one hand and the holding member on the other hand being provided in one case with a spigot and in the other case with a socket into which the spigot can be pushed in each of a plurality of orientations of the spigot with respect to the socket so that the holding member can be fitted to the holder in each of a plurality of different orientations relative to the holder.

The spigot and socket are preferably of noncircular, for example square, cross-section.

The holder may consist of a first elongate portion and a shorter second elongate portion end-to-end with the first portion and inclined to it, in which case one of the spigot and socket will be at the free end of the second portion.

The holder may consist of a straight elongate first member end-to-end with an elongate second member having its two ends inclined with respect to one another. One of these members may be screwed into the other.

There may be a plurality of sockets on the holder or the holding member and/or a plurality of corresponding spigots, on the holding member or the holder, constructed to fit in the socket or sockets to give a further plurality of different orientations of the holding member with respect to the holder. For example, the holding member may be an elongate member with the first-mentioned spigot or socket at one end of it and a recess at the other end of it to receive one end of an elongate tape head cleaner and, if desired, there may be a spigot or socket at one side of the holding member and possibly another spigot or socket at another side of it, for example the opposite side.

The tape head cleaner may be of cotton felt, for example, and may be an elongate member of square cross-section, with one end bevelled, for example bevelled down to zero thickness, and the other end being for insertion in a recess, which will in that case also be of square cross-section, in the holding member.

According to the invention, there is also provided a kit of parts for use in cleaning magnetic heads of magnetic tape recording and/or playback machines, comprising an elongate first part, a plurality of elongate second parts each of which has its two ends inclined to one another by angles differing in different ones of the second parts and each second part and the first part being constructed to be connected end-to-end to one another to provide a holder, the kit further comprises at least one holding member which is constructed to receive and hold a tape head cleaner, the or each holding member on the one hand and the free end of each second part on the other hand being provided in one case with a spigot and in the other case with a socket into which the spigot can be pushed in any one of a plurality of orientations of the spigot with respect to the socket so that the holding member can be fitted to the holder in any one of a plurality of different orientations relative to the holder.

There may be in the kit at least one tape head cleaner, for example one for each holding member. These parts and the holders made from the first and second parts may have any of the features specified above.

BRIEF DESCRIPTION OF THE DRAWINGS

FIG. 8 shows a cleaning device assembled from the parts shown in FIG. 1 and in FIGS. 3 to 7.

DETAILED DESCRIPTION OF A PREFERRED EMBODIMENT

Figure 1:
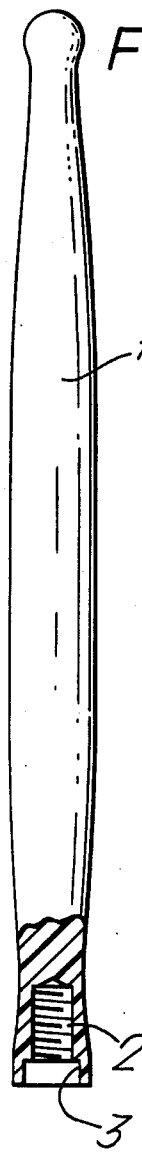
FIG. 1 shows a side view of a first part of a holder for a magnetic tape head cleaner.
Figure 2:
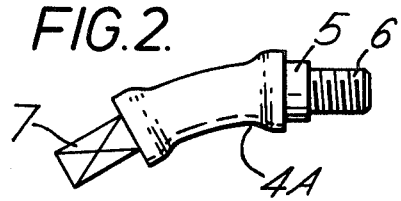
FIGS. 2 and 3 show side views of two different second parts of the holder, each of which can be fitted to the first part to make a complete holder.
Figure 3:
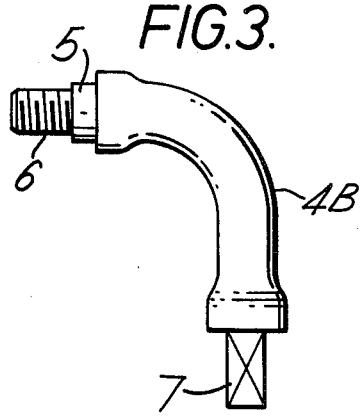
Figure 4:
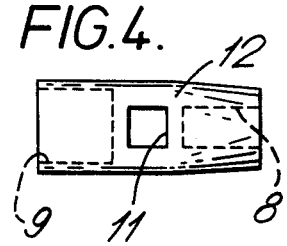
FIGS. 4 and 5 show respectively a side view and an end view of a holding member which can be fitted to either of the second parts shown in FIGS. 2 and 3, FIGS. 6 and 7 show respectively a side view and an end view of a tape head cleaner which can be held by the holding member.
Figure 5:
Figure 6:
Figure 7:

The drawing shows a complete kit of parts which can be assembled to make cleaning devices of a number of different shapes as required by a number of different magnetic tape recording and/or playback machines. The kit includes a first elongate part 1 of circular cross-section and of length 3.5 inches. At one end there is an opening which is screw-threaded at the place 2 and enlarged but not screw-threaded at the mouth 3. There are also parts 4A and 4B, each being elongate with its two ends inclined to one another, by 150° in the case of part 4A and by 90° in the case of part 4B. Each has at one end a projection 5 to match and lie in the wider part of the opening in the member 1 and a screw-threaded part 6 to match the screw-thread in the member 1. Each of the members 4A and 4B has at its other end a spigot 7 of square cross-section. The holding member 12 shown in FIGS. 4 and 5 is elongate and has at one end a socket 8 of square cross-section, to match the spigots 7, and has at the other end a recess 9 of square cross-section to match the tape head cleaner 10 shown in FIGS. 6 and 7. The holding member 12 tapers from the end shown to the left in FIG. 4 to the other end and the external shape is square at the left-hand end and circular at the right-hand end. On each of two opposite sides there is a further socket 11 of square cross-section to match the spigots, these sockets in this case meeting in the middle.

The part 1 and one of the parts 4A and 4B may be secured together by the screw threading and the holding member 12, with the left-hand end (FIG. 6) of the tape cleaning member pushed in to the recess 9, may be fitted to the holder formed by the parts 1 and 4A or 4B in any one of four orientations of the holding member 12 relative to the holder, the spigot 7 being pushed into the socket 8 in each case, by instead inserting the spigot 7 into one of the sockets 11 and/or by using the other one of the parts 4A and 4B, other orientations of the holding member 12 relative to the holder may be obtained.

Most of the possible examples in accordance with the invention will have dimensions within the following ranges
  length of part 1 — 3 inches to 7 inches
  thickness of part 1 — 0.1 to 0.5 inch
  length of parts 4A and 4B — 0.5 to 3 inches
  thickness of parts 4A and 4B — 0.1 to 0.5 inch
  length of part 12 — 0.5 to 2 inches
  thickness of part 12 0.15 to 0.5 inch
  length of part 10 0.25 to 2 inches
  thickness of part 10 0.125 to 0.75 inch.

The kit of parts may additionally include a further holding member 12 and a further tape head cleaner 10 so that one holding member and tape head cleaner may be reserved for use in a first operation with a liquid tape head cleaning substance on it and the other holding member and tape head cleaner may be reserved for use in a subsequent polishing operation which removes any remaining dirt and liquid cleaning substance from the tape heads. The two holding members 12 and/or the two tape head cleaners 10 may be differently coloured.

There may be in the kit of parts still more tape head cleaners 10.

We claim:

1. A device for cleaning magnetic heads of magnetic tape recording and/or playback machines, the device comprising
   an elongate holder, and
   a holding member which is constructed to receive and hold a replaceable tape head cleaner,
   the holder comprising
   a straight first elongate member, and
   a second elongate member connected releasably end-to-end with the first elongate member and having its two ends inclined to each other,
   a spigot of non-circular cross-section on the free end of the second elongate member, and
   a plurality of corresponding sockets in the holding member, the spigot and the sockets being shaped to allow the spigot to be located non-rotatably as a push fit in any one of the sockets in any one of a plurality of orientations of the holding member relative to the second elongate member.

2. A device according to claim 1, the spigot and the sockets being of square cross-section.

3. A device according to claim 1 in which the second elongate member is shorter than the first elongate member.

4. A device according to claim 1, in which one of the two members is screwed into the other.

5. A device according to claim 1, in which the holding member is elongate with one of the sockets at one end and a recess at the other end to receive one end of the tape head cleaner.

6. A device according to claim 5, in which there is a socket at one side of the holding member.

7. A device according to claim 6, in which there is another socket at another side of the holding member.

8. A device according to claim 7, in which the said another side is the opposite side.

9. A device according to claim 8, in which the two side sockets are provided by a single hole right through the holding member.

10. A device for cleaning magnetic heads of magnetic tape recording and/or playback machines, the device comprising
    an elongate holder,
    a holding member including a recess having a square cross section, and
    an elongate tape head cleaner having a square cross section at one end accommodated in the recess of the holding member,
    the holder comprising
    a straight first elongate member, and
    a second elongate member connected releasably end-to-end with the first member and having its two ends inclined to each other,
    a spigot of non-circular cross section on the free end of the second elongate member, and
    a plurality of corresponding sockets in the holding member, the spigot and the sockets being shaped to allow the spigot to be located non-rotatably as a push fit in any one of the sockets in any one of a plurality of orientations of the holding member relative to the second elongate member.

11. A device according to claim 10, in which the other end of the tape head cleaner is bevelled.

12. A kit of parts for cleaning magnetic heads of magnetic tape recording and/or playback machines, the kit comprising
    a straight first elongate holder member,
    a plurality of second elongate holder members each of which has its ends inclined to each other by angles differing in different ones of the second holder members, one end of each second holder member being releasably connectable to one end of the first holder member to provide a holder, the other end of each second holder member having a spigot of non-circular cross-section,
    at least one holding member which is constructed to receive and hold a tape head cleaner, and
    a plurality of corresponding sockets in the holding member, the spigots and the sockets being shaped to allow the spigot of any one of the second holder members to be located non-rotatably as a push fit in any one of the sockets in any one of a plurality of orientations of the holding member relative to the respective second holder member.

13. A kit of parts in accordance with claim 12, there being further provided at least one tape head cleaner.

* * * * *